April 9, 1940.  J. A. KLOD  2,196,455
CUTTER AND BLADE THEREFOR
Filed April 28, 1938

John A. Klod
INVENTOR.
BY Clarence E. Threedy
HIS ATTORNEY.

Patented Apr. 9, 1940

2,196,455

UNITED STATES PATENT OFFICE 2,196,455

CUTTER AND BLADE THEREFOR

John A. Klod, Chicago, Ill.

Application April 28, 1938, Serial No. 204,824

7 Claims. (Cl. 146—189)

This invention pertains broadly to comminuting and cutting devices, and more particularly to an improved cutter for use with meat grinders and the like, a principal object being the provision of a blade holder and an elongated cutting blade having formations for yielding engagement with the holder or carrier to secure the blade in operative position and yet permit easy withdrawal of the same for replacement, cleaning and the like.

Another object is the provision of an improved blade and blade carrier in which the blade is of elongated form and provided with a boss between its ends engageable in the intersection of blade seats in the carrier, the blades also having a bowed tail adapted to bear against a portion of the carrier to wedge the blade in its seat, the boss preventing longitudinal movement of the blade.

Another object is the provision of an improved blade and blade carrier for meat grinders in which the blade is of elongated form and substantially S-shaped in cross section and adapted to fit edgewise into a blade seat and carrier, the blade having a bowed tail wedging the same in its seat, and a boss formation arranged in a particular manner to prevent longitudinal movement in the seat.

Yet another object is the provision in a cutting device of a carrier having a recessed hub portion with elongated blade channels projecting laterally from the recess along marginal portions of the latter, and elongated blade members fitted edgewise into the blade channels and each having a bowed tail projection extending into the recess to secure the blades yieldably in their seats, each blade having a boss between its ends and projecting into the intersection of adjoining channels to prevent movement longitudinally of the latter.

Other objects and novel aspects of the invention reside in certain details of construction and operation of the device hereinafter described and specified in view of the annexed drawing in which:

Fig. 4 is a fragmentary cross section to enlarged scale through the blade and carrier, demonstrating the function of the boss and bowed tail; while

The present invention is related to the type of cutter described in my United States Patent 1,869,220, and my United States Patent No. 2,173,366.

Figure 1:
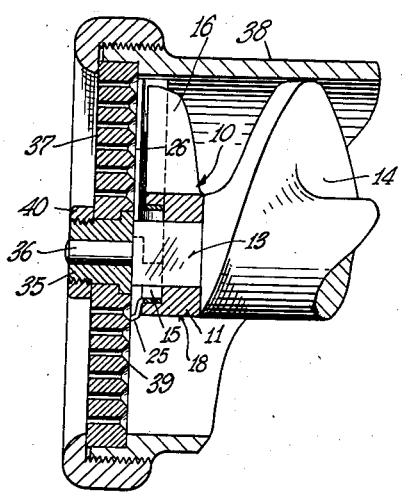
Fig. 1 is a fragmentary section through the cutting mechanism in a meat grinder.
Figure 2:
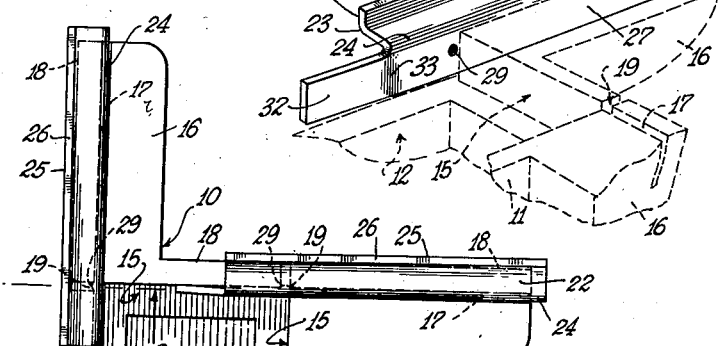
Fig. 2 is an enlarged plan of the improved blade and blade carrier in assembled relation.

In a preferred embodiment of the invention, there is provided a blade holder or carrier 10, preferably of the form shown in Fig. 2, this carrier having a hub portion 11 provided with a keyed opening 12, preferably of square form, for engagement with the squared hub 13 (Fig. 1) of a cutting worm 14. The carrier is additionally provided with a recessed hub portion 15, preferably conforming in shape to the keyed opening 12.

In the illustrated form of carrier, there are a plurality of outwardly projecting blade arms 16 each disposed at right angles to the other and each extending along a line parallel to a side of the opening 12 and the corresponding margin or side of the recess 15. Intersecting blade seats or channels 17 are provided in each of the arms 16 close to and extending collaterally with the leading edge portions 18 of the arm 16, the leading edges confronting the path of movement of the carrier as it rotates about the axis of the hub portion 11. Adjoining channels 17 intersect each other as at 19 to provide boss-receiving crevices or niches, and the inner terminals of the several channels extend into or communicate with the recess 15, preferably along lines flush with the sides of the latter.

Figure 3:
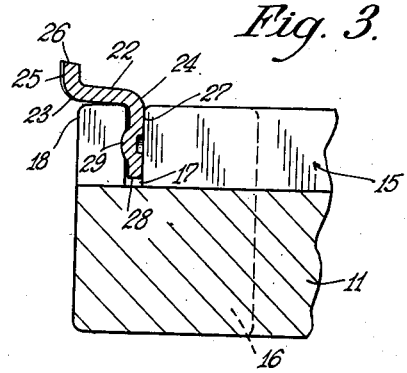
Fig. 3 is an enlarged fragmentary section through a blade in its seat, as viewed along line 3—3 of Fig. 2.
Figure 5:
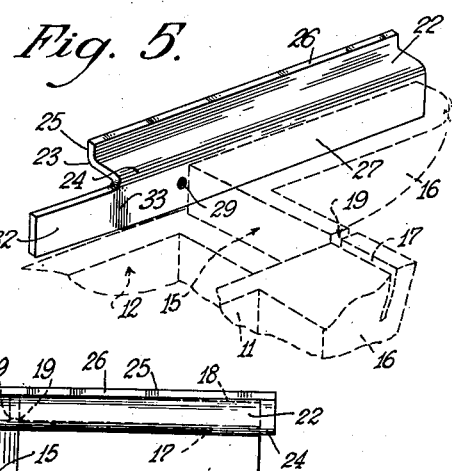
Fig. 5 is a perspective view of the improved blade.

The improved cutter blades (Figs. 3 and 5) are preferably substantially S-shaped in cross section as a result of being provided with opposite bends along longitudinally extending lines, so that there is an intermediate face 22 between the longitudinal bends 23 and 24 and a blade face 25 ground to provide a cutting edge 26 offset from the intermediate portion 22, and a seating face 27 along the other side of the intermediate portion 22, this latter construction being generally similar to the improved form of blade shown in my aforesaid Patent No. 2,173,366.

Figure 4:
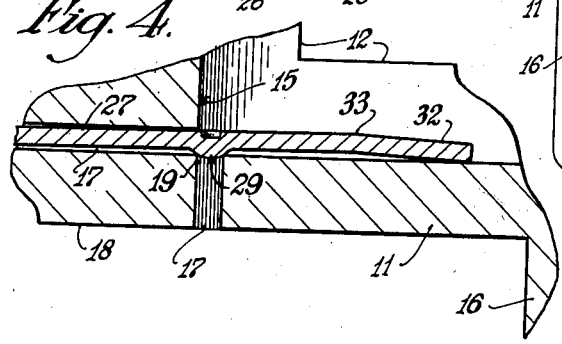

An additional feature of novelty in the blade, and one which is of great utility, includes means for yieldably seating the blades in their respective channels, this means including a protubertive or boss 29 (Figs. 3, 4 and 5) formed or punched into the seating face 27 of the blade between the ends of the latter so as to fit into the intersection 19 of the blade channels and thus prevent movement of the blades longitudinally in the channels. At the inner ends of each blade and constituting a projection or extension from the seating faces 27 thereof are wedging tails 32 bowed outwardly as at 33 (Figs. 4 and 5) so as to bear against the inner surfaces of the recess 15 and wedge the blades in place to prevent the same from working laterally out of their channels and to prevent any possibility of displacement of the bosses 29 due to vibration or resulting from increased clearances due to wear and the like. Because the metal of the blades is in the nature of a tool steel or is otherwise tempered to provide a suitably wear-resistant cutting edge, the bowed tails, formed and arranged substantially as set forth, provide that degree of yieldability which is ideally suited to permit for ready insertion of the blades in their seats, as well as relatively easy manual withdrawal from the seats, while at the same time wedging the blades so securely in place that there is no possibility of their working loose during operation of the cutter.

In assembling the cutting unit, the several blades are fitted with their seating edges 28 into their respective channels 17 in the arrangement shown in Fig. 2, the tails of the blades preferably being lowered into the hub recess 15 first, the bosses 29 thereupon being urged into the boss-receiving seats or intersections 19 and the remaining outer portions of the blade thereafter forced down into the channel. With the cutting head or carrier assembled as aforesaid, the same is fitted onto the squared hub portion 13 of the cutting worm 14 (Fig. 1), the threaded bushing 35 being fitted onto the end spindle 36 of the worm and there being an apertured cutting block 37 fitted over the bushing into its seat in the cutting tube 38 so that the inner face 39 of the block bears against the cutting edges 26 of the several blades, a nut 40 threaded onto the bushing 35 securing the block in position. The feeding worm 14 is rotated by any suitable means to force the material against the inner face 39 of the cutting block, the carrier 10 rotating with the worm and sweeping the cutting edges of the blades across the inner ends of the several openings in the block with a resulting comminution of the material and forcing of the same outwardly of the block.

By virtue of the offset disposition of the cutting edge 26 relative to the seating face 27, the thrust on the blade (Figs. 3 and 5) is taken up almost entirely on the surfaces of the arms underlying the intermediate portions 22 of the blades and disposed between the leading edges 18 and the channels 17. An advantage of this arrangement pointed out in my aforesaid application resides in the fact that the cutting edge of the blade is projected out of the plane of the carrier, thus reducing the tendency of the foodstuff or other material to collect beneath the blades and also preventing its being pushed out of the path of the cutting edge of the blade, whereby the cutting efficiency of the device is considerably increased. The provision of the intermediate surface 22 for taking up the major portion of the thrust against the cutting edge of the blade is also of importance for it permits a certain degree of yieldability along the outer bend line 23 and also permits a limited amount of give between the inner bend 24 and the cutting edge, so that there is relatively little displacing movement transmitted to the seating portion 27 in the channels. As a result it may be said that the blade-seating arrangement and the form of the blades provides a form of automatic take-up which permits urging the carrier and the blades thereof more firmly against the cutting block, with the assurance that there will be a sufficient yield to prevent grinding the blade edges down too quickly. Moreover, the distribution of the forces resulting from the cutting movement of the blades is such as to provide for maximum efficiency of the securing means, particularly the bowed tail portions 32. Another advantage of the novel arrangement resides in the relatively open region provided by the recess 15, with the resulting absence of crevices into which the comminuted material may become packed, material which may become lodged in the recess 15 being very easily removed and most of it becoming dislodged when the worm is separated from the carrier.

The various objects and advantages of the invention may be realized by other forms of construction than that specified herein for purposes of illustration, and it will be understood that the invention is not limited to any of the details set forth herein except as may be provided in the appended claims.

Having thus described my invention, what I claim as new and desire to protect by Letters Patent is:

1. In a device of the class described, a carrier having a recessed hub portion and a plurality of elongated intersecting blade channels extending at right angles to each other from said recessed portion, elongated blade members fitted edgewise into said channels and each having a boss projecting into the intersection of adjoining channels and effective to prevent movement of the blades longitudinally of their respective channels, each blade having a bowed tail at its inner end in said recessed portion and bearing against a side of the latter to yieldably maintain the blade against movement laterally out of its channel.

2. In a meat cutter, a revoluble carrier having a recessed hub portion with a plurality of intersecting elongated blade channels projecting outwardly of said recessed portion, the intersecting junctures of said channels forming boss-receiving niches, elongated blade members having opposite bends along longitudinal lines to provide an intermediate surface portion flanked by a cutting edge and a seating edge, the seating edges of each blade being fitted into one of said channels, each blade having a boss between its ends adjacent said seating edge and fitted into the corresponding niche to prevent longitudinal movement of the blade, said intermediate surfaces resting against a surface of the carrier adjoining said channels and each blade having a tail portion constituting an extension of the seating edge portion thereof and projecting into said recessed portion of the hub and biased so as to bear against a wall portion of said recessed portion, whereby said blades are wedgedly maintained against movement laterally out of their channels.

3. In a device of the class described, a carrier having a hub portion with a square recess therein and elongated blade channels extending collaterally from each side of the recess, said channels intersecting at the corners of the recess to provide niches, elongated blade members fitted edgewise into said channels and each having a boss receivable in one of said niches to prevent longitudinal movement of the blade in the carrier, each blade having a bowed tail portion at its inner end in said recess and engaging a wall portion of the latter to yieldingly hold the blade against movement laterally out of its channel.

4. In a device of the class described, a revoluble carrier having a hub portion with a square recess and blade arms arranged at right angles to each other in a manner each to project in a direction parallel to a side of said square recess, each of said arms having an elongated channel therein extending through its length coincidently with the corresponding parallel side of the square recess, adjoining channels intersecting at the corners of said recess to provide boss-receiving niches, each of said arms having a leading edge confronting the path of rotation of said carrier and parallel with the corresponding channel, elongated blade members fitted edgewise into said channels and having a bowed tail portion projecting into said recess and bearing against a wall portion of the latter to yieldingly hold the blade against movement laterally of its channel, each blade having a boss projecting into the corresponding niche to prevent longitudinal movement of the blade, and each blade having a cutting edge projecting in advance of said leading edge in the corresponding arm.

5. In a device of the class described, a revoluble carrier having a hub portion with a square recess and blade arms arranged at right angles to each other in a manner each to project in a direction parallel to a side of said square recess, each of said arms having an elongated channel therein extending through its length coincidently with the corresponding parallel side of the square recess, adjoining channels intersecting at the corners of said recess to provide boss-receiving niches, each of said arms having a leading edge confronting the path of rotation of said carrier and parallel with the corresponding channel, elongated blade members fitted edgewise into said channels and having a bowed tail portion projecting into said recess and bearing against a wall portion of the latter to yieldingly hold the blade against movement laterally of its channel, each blade having a boss projecting into the corresponding niche to prevent longitudinal movement of the blade, and each blade being bent in opposite directions along parallel longitudinal lines to provide an intermediate section arranged to rest against the portion of the corresponding arm between said channel and leading edge thereof and having an offset cutting edge projected in advance of said leading edge of the arm and out of the plane of said carrier.

6. A cutting blade of elongated form and having opposite bends about parallel longitudinally extensive lines whereby to provide an intermediate portion flanked by oppositely projecting offset edge portions one of which constitutes a cutting edge and the other of which constitutes a seating portion, said seating portion having a projection offset in a direction laterally thereof and arranged and constructed to constitute a securing tail for wedging engagement in a blade-receiving member, said seating portion having means for engagement with said blade-receiving member to prevent movement of the blade in a longitudinal direction.

7. In a device of the class described, means providing a blade carrier having a leading edge with an elongated blade-receiving opening extending parallel with said edge, said opening having an enlarged area at one end, an elongated blade bent in opposite directions about parallel longitudinal lines to provide an intermediate surface flanked on one side by an elongated seating surface adapted to fit into said opening and flanked on the other side by an offset cutting edge projecting beyond said leading edge and out of the plane of said carrier when said blade is in said opening, said intermediate surface portion resting against a portion of said carrier between said leading edge and said opening, said seating surface having a tail projection bowed and projecting into said enlarged portion of the opening to bear against a side thereof and yieldingly hold the blade against movement laterally out of said opening, said seating surface having a lateral projection between its ends and fitted into a niche provided in a side of said opening whereby longitudinal movement of the blade in said opening is prevented.

JOHN A. KLOD.